US009460617B2

(12) United States Patent
Beaurepaire et al.

(10) Patent No.: US 9,460,617 B2
(45) Date of Patent: Oct. 4, 2016

(54) METHOD AND APPARATUS FOR NOTIFYING DEVICE USERS OF A BOTTLENECK STATUS

(71) Applicant: HERE Global B.V., Veldhoven (NL)

(72) Inventors: Jerome Beaurepaire, Berlin (DE); Marko Tapio Tuukkanen, Schlenzer (DE)

(73) Assignee: HERE GLOBAL B.V., Veldhoven (NL)

( * ) Notice: Subject to any disclaimer, the term of this patent is extended or adjusted under 35 U.S.C. 154(b) by 107 days.

(21) Appl. No.: 14/264,225

(22) Filed: Apr. 29, 2014

(65) Prior Publication Data
US 2015/0310739 A1 Oct. 29, 2015

(51) Int. Cl.
G06F 19/00 (2011.01)
G08G 1/01 (2006.01)
G08G 1/005 (2006.01)
G08G 1/0967 (2006.01)
H04W 4/04 (2009.01)
H04W 4/02 (2009.01)

(52) U.S. Cl.
CPC .......... G08G 1/0141 (2013.01); G08G 1/005 (2013.01); G08G 1/012 (2013.01); G08G 1/0112 (2013.01); G08G 1/0129 (2013.01); G08G 1/0133 (2013.01); G08G 1/0145 (2013.01); G08G 1/096716 (2013.01); G08G 1/096741 (2013.01); G08G 1/096775 (2013.01); H04W 4/046 (2013.01); H04W 4/023 (2013.01); H04W 4/025 (2013.01)

(58) Field of Classification Search
CPC .......... G08G 1/0141; G08G 1/01404; G08G 1/096716; G08G 1/096775; G08G 1/096741
USPC ........ 701/117, 400; 455/456.1, 414.2, 414.3, 455/456.2, 456.3, 457
See application file for complete search history.

(56) References Cited

U.S. PATENT DOCUMENTS

| 7,197,320 | B2* | 3/2007 | Joseph | H04W 4/02 455/414.2 |
| 8,676,401 | B2* | 3/2014 | Asada | B60L 11/1824 701/2 |
| 2009/0034656 | A1* | 2/2009 | Cho | H04H 20/57 375/316 |
| 2010/0151838 | A1* | 6/2010 | Wormald | G08G 1/096716 455/414.1 |
| 2012/0109454 | A1* | 5/2012 | Fischer | B60Q 1/484 701/36 |
| 2013/0154853 | A1* | 6/2013 | Chen | G08G 1/096716 340/905 |
| 2014/0091949 | A1* | 4/2014 | Tickoo | H04W 4/02 340/905 |
| 2015/0010212 | A1* | 1/2015 | Segarra | G08G 1/096758 382/104 |
| 2015/0091716 | A1* | 4/2015 | Hathaway | B60Q 1/525 340/435 |
| 2015/0156013 | A1* | 6/2015 | Zhao | H04L 9/0819 380/270 |
| 2015/0160023 | A1* | 6/2015 | Goel | G01C 21/34 701/400 |
| 2015/0176997 | A1* | 6/2015 | Pursche | G01C 21/26 340/905 |
| 2015/0243167 | A1* | 8/2015 | Stahlin | G08G 1/096791 340/902 |

FOREIGN PATENT DOCUMENTS

WO    WO2013113904    *   8/2013

* cited by examiner

Primary Examiner — Shardul Patel
(74) Attorney, Agent, or Firm — Ditthavong & Steiner, P.C.

(57) ABSTRACT

An approach is provided for alerting device users engaged in various modes of travel they are creating a bottleneck. A notification platform causes, at least in part, a detection of movement pattern information associated with at least one device and at least one neighboring device. The notification platform also processes the movement pattern information to determine that the at least one device represents at least one potential bottleneck to a movement of the at least one neighboring device. The notification platform also causes, at least in part, a presentation of at least one message to the at least one device, the at least one neighboring device, or a combination thereof regarding the at least one potential bottleneck.

20 Claims, 12 Drawing Sheets

100

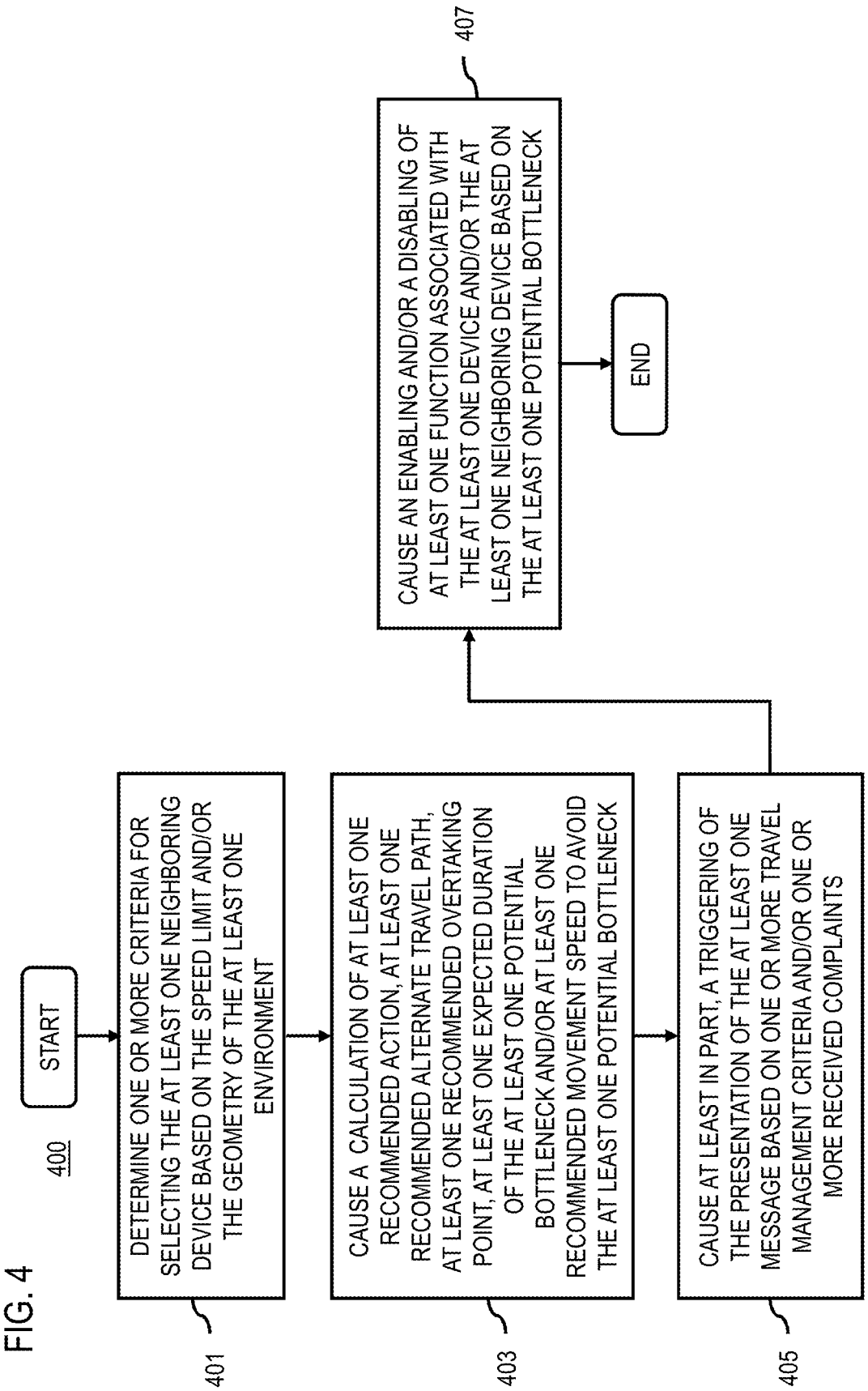

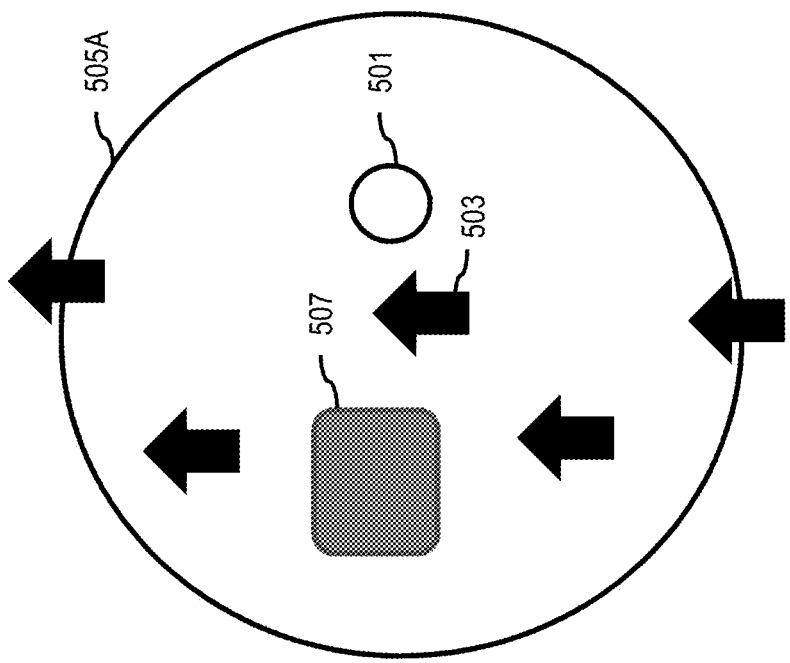
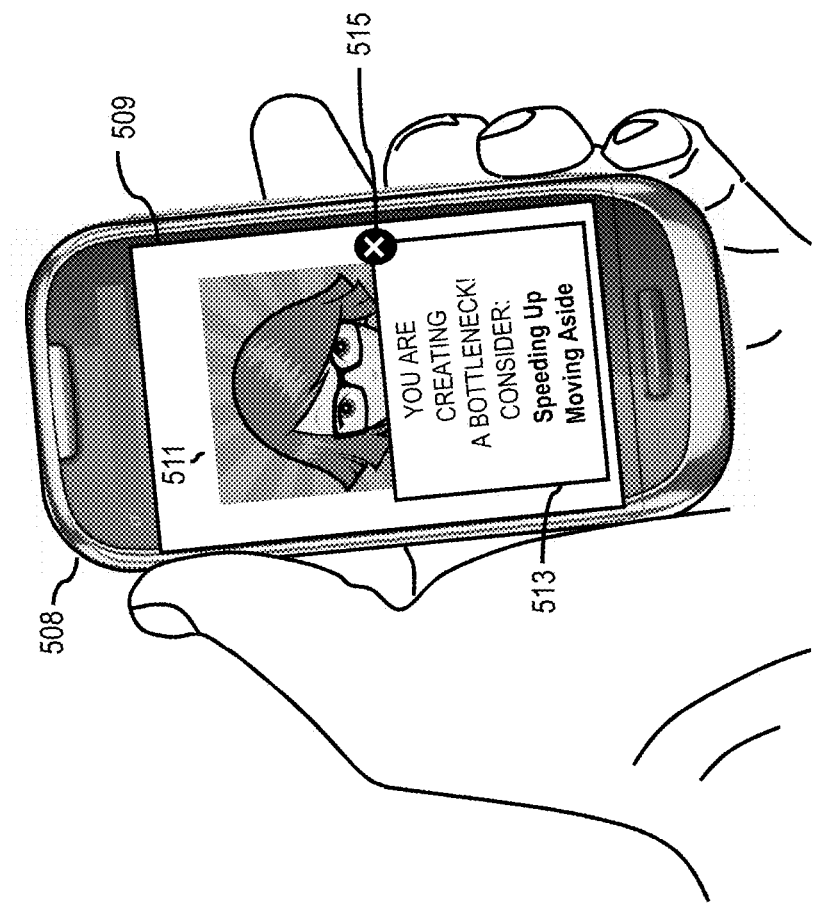

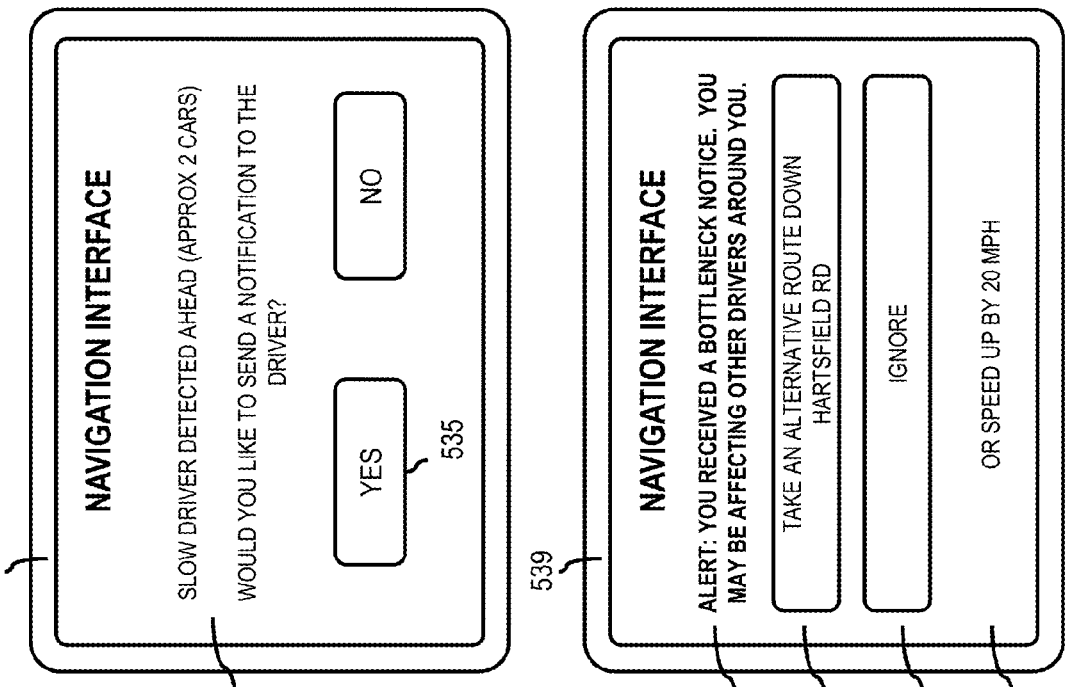
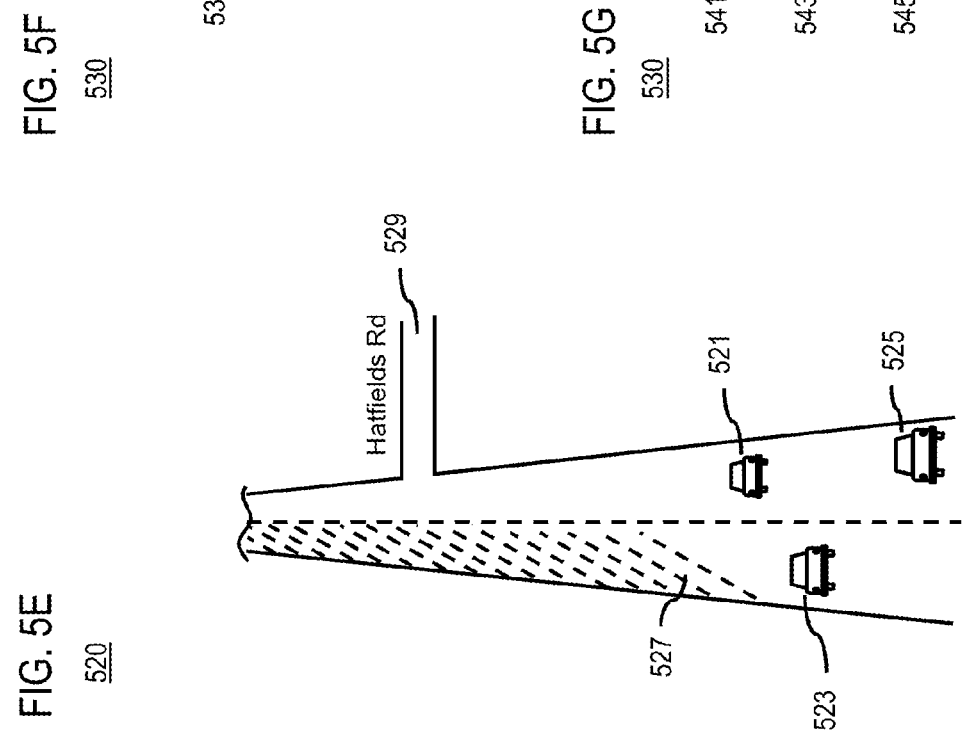

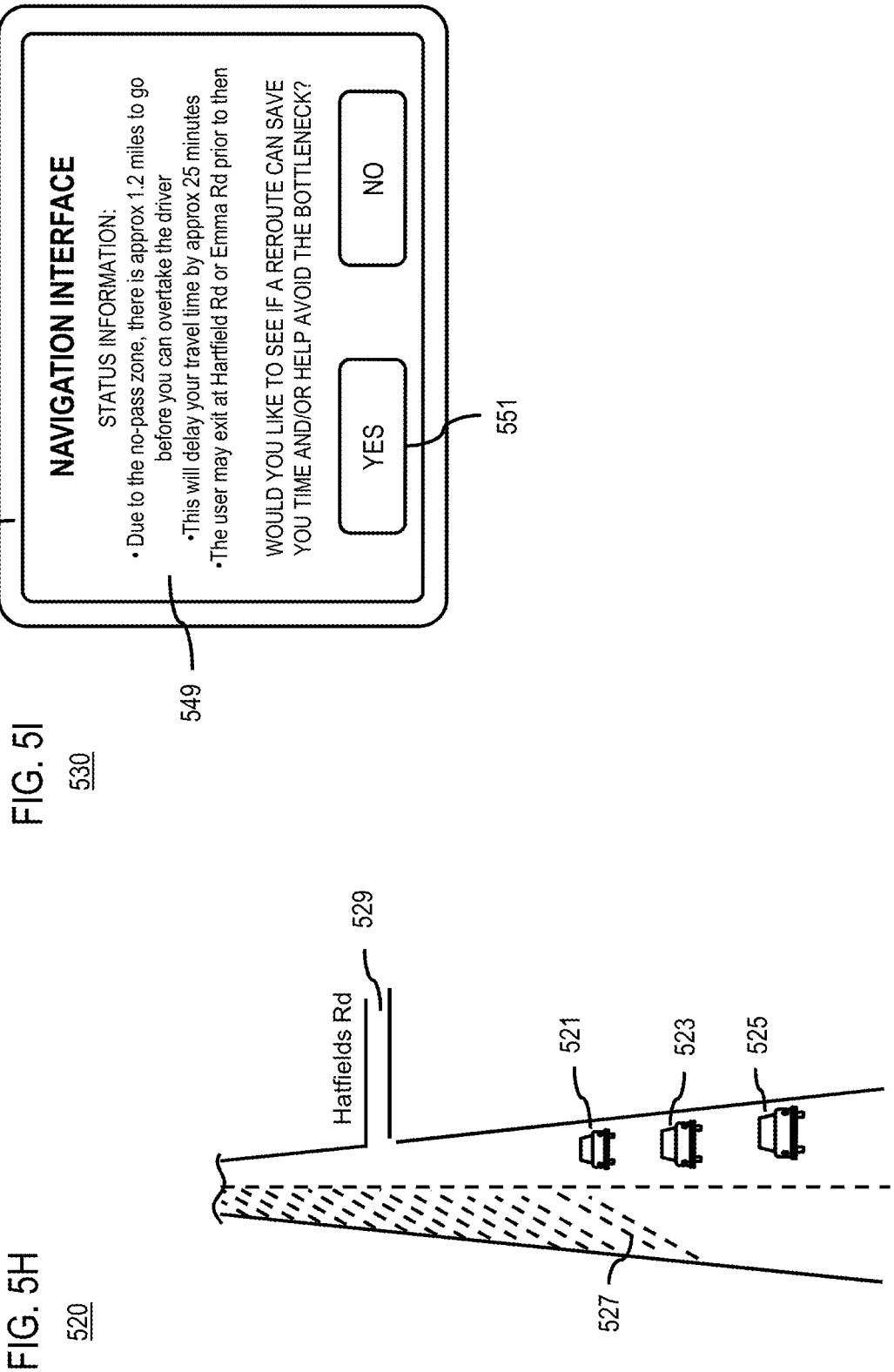

METHOD AND APPARATUS FOR NOTIFYING DEVICE USERS OF A BOTTLENECK STATUS

BACKGROUND

Service providers and device manufacturers (e.g., wireless, cellular, etc.) are continually challenged to deliver value and convenience to consumers by, for example, providing compelling network services. One area of interest has been the development of location-based services for improving the travel navigation experience. For instance, some people get preoccupied with their mobile devices as they walk about a given area. Therefore, they pay no attention to others nor are they aware of how their limited pace is affecting other pedestrians. Similarly, in the case where a person is driving slowly along a narrow roadway, the slow driver may adversely affect the pace of other travelers. Unfortunately, there is currently no convenient means of alerting travelers that they are creating a bottleneck.

SOME EXAMPLE EMBODIMENTS

Therefore, there is a need for an approach for alerting device users engaged in various modes of travel they are creating a bottleneck.

According to one embodiment, a method comprises causing, at least in part, a detection of movement pattern information associated with at least one device and at least one neighboring device. The method also comprises processing and/or facilitating a processing of the movement pattern information to determine that the at least one device represents at least one potential bottleneck to a movement of the at least one neighboring device. The method further comprises causing, at least in part, a presentation of at least one message to the at least one device, the at least one neighboring device, or a combination thereof regarding the at least one potential bottleneck.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a detection of movement pattern information associated with at least one device and at least one neighboring device. The apparatus is also caused to process and/or facilitate a processing of the movement pattern information to determine that the at least one device represents at least one potential bottleneck to a movement of the at least one neighboring device. The apparatus is further caused to present at least one message to the at least one device, the at least one neighboring device, or a combination thereof regarding the at least one potential bottleneck According to another embodiment, a computer-readable storage medium carries one or more sequences of one or more instructions which, when executed by one or more processors, cause, at least in part, an apparatus to cause, at least in part, a detection of movement pattern information associated with at least one device and at least one neighboring device. The apparatus also processes and/or facilitates a processing of the movement pattern information to determine that the at least one device represents at least one potential bottleneck to a movement of the at least one neighboring device. The apparatus is further caused to present at least one message to the at least one device, the at least one neighboring device, or a combination thereof regarding the at least one potential bottleneck.

According to another embodiment, an apparatus comprises means for causing, at least in part, a detection of movement pattern information associated with at least one device and at least one neighboring device. The apparatus also comprises means for processing and/or facilitating a processing of the movement pattern information to determine that the at least one device represents at least one potential bottleneck to a movement of the at least one neighboring device. The apparatus further comprises means for causing, at least in part, a presentation of at least one message to the at least one device, the at least one neighboring device, or a combination thereof regarding the at least one potential bottleneck.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A, 3B and 4 are flowcharts of processes for alerting device users engaged in various modes of travel they are creating a bottleneck, according to various embodiments;

FIGS. 5A-5I are diagrams of various modes of travel of users and corresponding interfaces of user devices utilized in the processes of FIGS. 3A, 3B and 4, according to various embodiments;

DESCRIPTION OF SOME EMBODIMENTS

Examples of a method, apparatus, and computer program for alerting device users engaged in various modes of travel they are creating a bottleneck. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
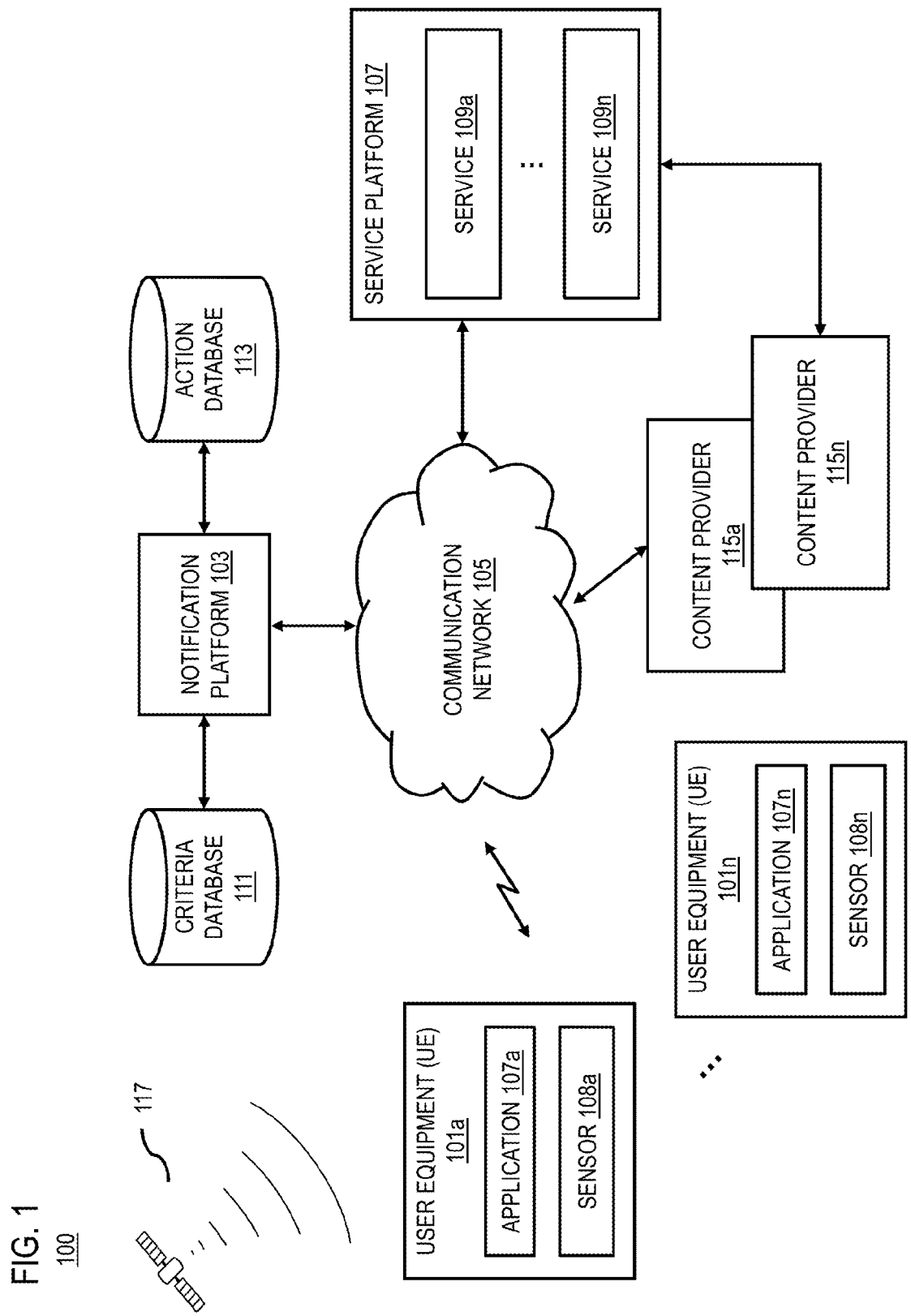
FIG. 1 is a diagram of a system for alerting device users engaged in various modes of travel they are creating a bottleneck, according to one embodiment.

FIG. 1 is a diagram of a system for alerting device users engaged in various modes of travel they are creating a bottleneck, according to one embodiment. For the purpose of illustration herein, a bottleneck includes any occurrence wherein a user or a vehicle associated with a user inhibits a flow, movement or direction of other users or vehicles travelling along the same travel path (e.g., roadway, walkway or pathway). With the rise in popularity of smartphones and other portable devices, it is easy for users to be distracted or preoccupied with their devices as they travel. The users may be enthralled with a phone conversation, engaged in social media activities, playing games, listening to music, etc., and as a result, may not pay attention to others. For example, a user walking in an airport corridor may not notice others walking along or behind them down the corridor. Similarly, drivers may be preoccupied as they engage with a caller or listen to music and unwittingly inhibit the flow traffic. This phenomenon can be quite annoying to other travelers especially given that there is currently no convenient, friendly means of identifying and subsequently notifying the user responsible for the bottleneck.

To address this problem, system 100 of FIG. 1 enables users of devices that are travelling by vehicle or foot along a travel path (e.g., roadway, walkway, pathway) to determine the source of a bottleneck. In addition, system 100 enables users to generate and transmit a message for alerting another device user that they are the source of the bottleneck, for requesting an action be taken by this user to eliminate the bottleneck, etc. Still further, system 100 enables users subject to the bottleneck to be presented with options for responding to the bottleneck. As will be discussed further, the system 100 may employ various location-based detection techniques, motion tracking techniques, geometry determination techniques or the like for enabling one or more of the above described executions. The notification of devices determined to be the source of a bottleneck may be performed regardless of whether the source device is or is not configured to interact with the system 100.

In one embodiment, a notification platform 103 interfaces with one or more user equipment (UE) 101a-101n (also collectively referred to as UE 101) configured with one or more applications 107a-107n (also collectively referred to as applications 107). By way of example, UE 101 may include a mobile device, tablet computer, in-vehicle navigation system or the like. Also, the applications 107 of the UE 101 may be implemented as a notification application or service for presenting an interface for interacting with the notification platform 103. Alternatively, the application 107 may be a navigation application featuring various capabilities for generating and/or acquiring navigation information (e.g., driving and/or walking directions, maps, location information) as well as for interfacing with the notification platform 103. In the latter, the notification platform 103 may execute various application programming interfaces (APIs) for supporting the generation of notifications, instructions and the like within the context of a navigation session of a user of a device, i.e., UE 101.

In one embodiment, the notification platform 103 may also be configured to interface directly with a service platform 107, which provides users of the applications 107 with various location based services 109a-109n (also collectively referred to as services 109). In addition, the notification platform 103 may interface with one or more content providers 115a-115n (also collectively referred to as content providers 115) that provide/deliver content of various types and genres (e.g., navigation content, travel content, locality content, marketing content) upon request. Requests may be initiated via communication network 105 by way of the applications 107 with respect to criteria and/or request input. The criteria may include search criteria such as address information or point of interest information, for accessing navigation information or relevant environmental information pursuant to a location based request.

By way of example, the services 109 may access turn-by-turn directions, routing information, maps, driving instructions, etc. In addition, the services 109 may maintain and/or gather relevant point of interest information regarding different roadways, lanes, streets, exits, buildings, landmarks, bodies of water, parks, etc. The data may include specific geographic coordinates, geospatial information and the like. It is further noted that the dataset maintained and/or gathered by respective services 109 may include information for supporting augmented reality applications or performing 3D interaction.

As another example, a request may be initiated via the application 107 with respect to content providers 115 for determining information related to objects (e.g., landmarks, roadways, buildings, parks) within a specific range of a user or UE 101. Content regarding one or more historical movement patterns of users, bottleneck occurrences, traffic patterns relative to a given location, details regarding one or more vehicles, etc., may also be accessed upon request. This may include municipality data or local ordinance data for conveying roadway speed limits, bike lane locations and times, commuter lane regulations, traffic information, content regarding local event or venue data, crowd sourced information and the like. It is noted that the data accessed from or gathered by the services 109 and content providers 115 may be used by the notification platform 103 to determine relevant environmental, social, locality or user related information.

In addition, the platform 103 may process the data to determine geometric and spatial relationships between respective users/UE 101 and objects for a given location or range of interest. Under this approach, the relative positions, orientations and placement of users/UE 101 may be determined. Furthermore, changes or differences in the relative positions, orientations and/or placement of UE 101 may be detected for distinguishing between users. As such, in the case where a large queue of users are within range of one another, the user at the front of the queue may be identified based on movement patterns of the UE 101 prior to the movement. As such, the platform 103 may selectively transmit messages to only the UE 101 associated with the bottleneck as opposed to all of the neighboring UE, i.e., users at the end or in middle of the queue.

It is noted the UE 101 may employ various range based protocols and/or proximity detection techniques. As such, the UE 101 may determine the presence of other objects and their respective geometrical or spatial relationships. In one embodiment, the range is based on local connectivity and therefore, limited to a certain distance from the UE 101 (e.g., within sight of the user). By limiting the range, the exchange of data between respective UE 101 is also maintained locally, thus ensuring the data of neighboring devices is between those within range of each other. In certain implementations, this interaction may be based on permission settings, privacy policies and the like as established by the users of UE 101 per a user profile. Alternatively, the interaction may be between UE 101 configured to interact with the platform 103 (e.g., having established a user profile) and UE that is not, based on short-range communication techniques.

It is further noted the UE 101 can be configured to dynamically regulate the distance or range of local connectivity. This may include enabling the UE 101 to switch between various connectivity protocols to more accurately detect the movement patterns of neighboring devices. For example, the UE 101 may dynamically switch between Bluetooth connectivity and Wi-Fi connectivity, both of which have different ranges for detecting neighboring devices and their relative direction/position. If a neighboring device is initially detected by a UE 101 via Bluetooth (low range detection) but later only capable of detection via Wi-Fi (long range detection), this indicates to the platform 103 the neighboring device is moving away from the user. As another example, the UE 101 may toggle between connectivity protocols in order to detect neighboring devices coming from behind the user as the user travel through a corridor. As yet another example, when the user is in a crowded parking lot for a period of time, the UE 101 may detect the presence of an improperly parked vehicle creating the bottleneck. In each of these examples, the notification platform 103 processes the movement patterns then proactively notifies the user of the bottleneck (the specific vehicle or UE 101, their location/direction, etc.).

In one embodiment, the notification platform 103 uses the data provided by the services 109 and/or content providers to gather contextual information associated with users of UE 101, other users of UE 101 within a relative proximity of the user, the location and/or environment of the user, or a combination thereof. The contextual information may include data for specifying the dimensions or spatial qualities of the travel path (e.g., narrow versus wide roadway), speed limit data relative to the travel path, travel direction information relative to the travel path (e.g., one way, two-way), travel path type (e.g., multi-lane, single lane, dead end, exit, highway, roadway), or the like. In addition, the platform 103 may also identify obstructions along the travel path, including those known in advance, such as due to the presence of a building or landmark, alternate paths and/or routes for fulfilling a navigation session, or a combination thereof. Still further, the contextual information may specify information regarding vehicles associated with users along the travel path, including vehicle dimension information, vehicle type, etc.

In addition to collecting static data, the notification platform 103 may also gather contextual information by way of the one or more sensors 108a-108n (also collectively referred to as sensors 108) of the UE 101 and neighboring UE 101 during navigation. For example, the sensors 108 may be used for determining unexpected obstructions that may occur along a travel path, such as an accident, roadwork, construction, stalled vehicle or other traffic encumbrances. It is noted that the gathering process may include both real-time, sensor based collection techniques along with static, information culling based techniques.

In one embodiment, the notification platform 103 detects movement pattern information regarding a user of UE 101, other users of UE 101 within a relative proximity of the user, or a combination thereof. By way of example, the movement pattern information may include any data capable of being processed by the platform 103 for determining a direction of travel, speed of travel, pace/rate of travel, path of travel, type/mode of travel, a location and/or proximity of travelers relative to one another, or a combination thereof. The movement pattern information may be associated with pedestrian movement of a user (e.g., walking or running), a movement of a vehicle associated with a user (e.g., bike, car, personal transport device), an ad-hoc movement of the user and/or vehicle, or a combination thereof.

Detecting of the movement pattern information may be carried out based, at least in part, on sensor data gathered by one or more sensors 108a-108n (also collectively referred to as sensors 108) of respective UE 101 during travel along a travel path. By way of example, sensors 108 (e.g., of a mobile device or embedded within the vehicle) may be used as GPS receivers for interacting with one or more satellites 117 for determining speed, position and location data. In addition, the sensors may gather tilt data (e.g., a degree of incline or decline of the vehicle during navigation), motion data, temporal data, sound data, presence data and the like associated with the users (members) and/or UE 101 that comprise the group.

Still further, the sensors 108 may detect local or transient network and/or wireless signals, such as those transmitted by neighboring devices during walking of a user or driving of a vehicle to a destination. This may include, for example, network routers as configured within a premise (e.g., home or business), another UE 101 or an intelligent/communicable traffic system (e.g., traffic lights, traffic cameras, traffic signals, digital signage). It is further noted, in certain implementations, that the sensors of a vehicle may be identical to, or configured to interact with, the sensors 108 of the UE 101 for enabling data exchange and interaction. The exchange may be facilitated by way of any known or still developing range based or wireless communication protocols.

In one embodiment, the notification platform 103 processes the gathered movement pattern information and contextual information to determine a potential bottleneck along a given travel path. The processing may be performed after collection of the movement pattern information and contextual information for a period of time in order to build up a sufficient data set for characterizing the geometry of the environment, the proximity of UE 101 to one another, motion tendencies, speed characteristics, etc. In addition, the processing may be performed according to different groups of UE 101 as classified by their proximity to one another. For example, a first group may correspond to UE 101 within a certain range of the user (e.g., 10 feet) while a second group corresponds to UE 101 determined to be further away. By analyzing the movement patterns, geometry and tendencies of UE 101 on a group basis, the platform 103 may identify changes in speed of movement, direction, or timing that is most likely related to a bottleneck.

It is further noted that the platform 103 may enable the storing of individual movement patterns. Under this scenario, the movement patterns, which may include a typical/historic walking speed of the user, a typical number of steps of the user, a typical mode of transportation of the user, etc., may be stored in connection with a profile of the user. As such, this pattern information may be applied by the platform 103 with respect to other neighboring users for a given location and context to readily determine if the user is causing a queue and/or becoming the bottleneck. The user may also provide crowd sourced information regarding a particular bottleneck occurrence.

Furthermore, the historical movement pattern information, crowd sourced information, or the like may be compiled for a plurality of users and subsequently analyzed by the platform 103 as statistical data for predicting bottleneck locations, venues or event types commonly associated with bottlenecks, or the like. This corresponds to a feedback mechanism, for enabling the notification platform 103 to serve as a preventative tool. In addition, the feedback information may be shared and/or used in connection with a traffic service, event service, notification service, etc. Based on this feedback, the platform 103 may cause the delay, suspension or halting of certain executions of the UE 101 or applications 107. As such, an incoming notification (e.g., SMS, email), launch of a messaging application, or other execution may be delayed until the location and/or venue statistically associated with a bottleneck occurrence is surpassed by the user.

In one embodiment, the platform 103 determines a difference in the speed of movement, the direction of movement, the timing of movement, or a combination thereof between the at least one UE 101 of a user and the at least one neighboring UE 101. The determination may be based on criteria information maintained by the notification platform 103 via a criteria database 111. Criteria information may include one or more conditions or combinations of conditions that when fulfilled indicate the occurrence of a bottleneck. In addition, the criteria information may specify one or more actions and/or instructions to be applied by a user, a UE 101 or the neighboring UE 101, responsive to a bottleneck.

For instance, the criteria information may specify a minimum speed of movement to associate with a walking mode of travel for indicating a potential feedback. The criteria information may also specify a number of neighboring UE or positioning/geometry of said neighboring UE relative to the UE 101 of the UE in question for indicating a potential bottleneck. Still further, the criteria information may specify an expected pace of travel of users for various types of vehicles and/or modes of transportation. Hence, processing of the criteria information may vary depending on the determined movement pattern information and contextual information—i.e., narrowness of a roadway, time of day, motion types, mode of transport, vehicle type, etc.

By way of example, in the case where a user's walking pace is slower than the neighboring users, this occurrence may indicate to the platform 103 that the user is moving slowly enough to be a bottleneck. As another example, the platform 103 may utilize the criteria to detect an increase in the number of neighboring UE within the immediate proximity (a first grouping range) of a user of UE 101. Under this scenario, continued entry of neighboring UE to within range of the user of UE 101 with no change in the number of UE exiting this range (i.e., into a more distant second grouping range) may indicate a potential bottleneck, i.e., diminished flow of users/traffic.

As another example, the platform 103 may observe a change in positioning of neighboring UE, wherein many are determined as being positioned behind the user. This tendency of the neighboring UE to not overtake the position of the user of UE 101 may also indicate that the user is a potential bottleneck. As another example, the platform 103 may observe a stoppage of all users of UE at a point along the travel path where a known obstruction (e.g., mechanical bridge or railroad tracks) is located, thus indicating that the obstruction is the potential bottleneck. Still further, in the case where a movement of neighboring UE is to consistently go around the user of UE 101, this may indicate to the platform 103 that the user of UE 101 is not a bottleneck as there is no significant reduction in the flow of neighboring users.

Hence, it is noted that the gathering and subsequent processing of movement pattern information and contextual information per the notification platform 103 enables applications 107 to execute, enable or fulfill navigation sessions upon request regardless the mode of travel. In addition, the platform 103 may process rich, contextual details for supporting the identification of potential bottlenecks based on the real-time movement of users along a travel path. Still further, the platform 103 determines, based on the criteria information and gathered contextual data and movement pattern data, which user of UE 101 amongst a group comprising a specific range of UE is the source of the bottleneck.

In one embodiment, the notification platform 103 calculates a recommended action to be executed by a user, the neighboring users, or a combination thereof in response to a bottleneck. The platform 103 may also calculate pertinent status information or details regarding the bottleneck for informing the user as they navigate the path of travel relative to the bottleneck. The recommended action or pertinent status information as may vary depending on the user in question (the user that is the bottleneck versus the user subject to the bottleneck), the mode of travel (pedestrian versus vehicular travel), the travel path (airport walkway versus freeway) or other factors. In addition, the action to be executed may vary depending on the fulfillment of criteria.

An action database 113 may be maintained by the platform 103 for determining a particular action and/or particular status information to apply for a given condition/set of criteria being fulfilled and/or a specific context of a bottleneck occurrence. Hence, the action database may be accessed for correlating an action with a particular condition/criteria, a particular context or for supporting the calculation of an action to be taken. The calculation may be further performed in connection with the navigation service accordingly. It is noted that the action database 113 may also maintain user specified action recommendation, which may be applied and/or recommended to the user based on the preferences of the user (e.g., user established criteria).

By way of example, the recommendation may include a suggested increase in speed of the user, an alternate route or direction of the user for reaching the destination, a stopping of the user until a later point in time, etc. As another example, the pertinent status information may include a suggestion of a point along the travel path for overtaking the bottleneck, an expected duration of time of occurrence of the bottleneck, an approximate destination of the user corresponding to the bottleneck, an expected change in time of arrival information due to the bottleneck, etc. This may correspond to travel management information for enabling the user to assess the severity of a bottleneck and its effect on the user or neighboring users during a navigation session.

In one embodiment, the notification platform 103 triggers the presentment of a message for conveying the recommendation, the status information, or a combination thereof. The message may be triggered to occur in response to the determining of the potential bottleneck, in response to a change in status of the users due to the bottleneck, or the like. In addition, the message may also indicate feedback information regarding a bottleneck, such as that gathered from other users along the travel path. The feedback information may include complaints, user recommendations, venue recommendations, temporal recommendations or other details for enabling a user to manage the bottleneck.

As noted, the message is context specific, such that the message may be tailored to the context in which the bottleneck applies. Also, in one embodiment, the notification platform 103 may be configured to only present the message in limited contextual scenarios, such as only when the bottleneck applies to travel paths featuring limited space. Under this scenario, the platform 103 may cater the message and/or limit the display of the message to instances where the user is in a corridor, on an escalator, travelling along a stairwell, travelling along a narrow street, travelling in a tunnel, etc.

In one embodiment, the notification platform 103 may also trigger an enabling and/or disabling of a function of the UE 101, the neighboring UE, or a combination thereof in response to the potential bottleneck. This may correspond to a safety function of the platform 103, wherein the function of the UE 101 is disabled to ensure the user is paying attention to the travel path or their immediate environment rather than the UE. By way of example, in the case where it is determined the user is walking about an underground subway platform, the UE 101 may be temporarily disabled so that the user does not inadvertently walk off the ledge onto the electric tracks below, accidently bump into other train goers on the platform, etc. The safety preferences may be set as safety criteria per the criteria database 111 accordingly.

It is noted that the presenting of messages to the UE 101, the disabling of functions of the UE 101 and the like are performed by way of one or more application programming interface (API) executions of the notification platform 103. In addition, the platform 103 may be configured to enable the presenting of messages atop other applications of the UE 101, such that presentment of the message is prioritized over other messages, user interface executions, etc. Per this approach, for example, a message for indicating a user is a bottleneck to others as they walk along a narrow corridor of an airport may be caused to interrupt a user interface of a gaming application that is currently preoccupying the user. As another example, the platform 103 may detect and define the priority of the gaming application versus other applications of the device (e.g., a messaging application). Based on the priority, the platform 103 may initiate an instruction to cause the game to pause until the user is no longer a bottleneck. It is also noted the platform 103 may maintain a listing of priority actions, services and applications to be invoked for defining the message content to be presented and/or the criteria to be applied accordingly for responding to a bottleneck.

It is further noted that the determination of a bottleneck, calculation of a recommended corrective action, presentment of a message or the like need not be limited to UE 101 that interact with the notification platform 103. Hence, the notification platform 103 may enable users to address bottleneck occurrences regardless of the configuration of the UE 101 within a given local proximity. For example, in the case where UE 101 is capable of interacting with the platform 103 while a neighboring UE causing the bottleneck is not, the UE 101 may transmit a local message to the neighboring device accordingly.

By way of example, the notification platform 103 may be implemented as a cloud based service, hosted platform or the like for exchanging as well as receiving information from the services 109, providers 115 or applications 107. Alternatively, the notification platform 103 may be directly integrated for processing data generated and/or provided by the services 109, providers 115 or applications 107. Per this integration or interface, the notification platform 103 may translate location based information, navigation related content or the like as generated and exchanged during a navigation session into useful data for supporting the identification and notification of bottlenecks.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, notification platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
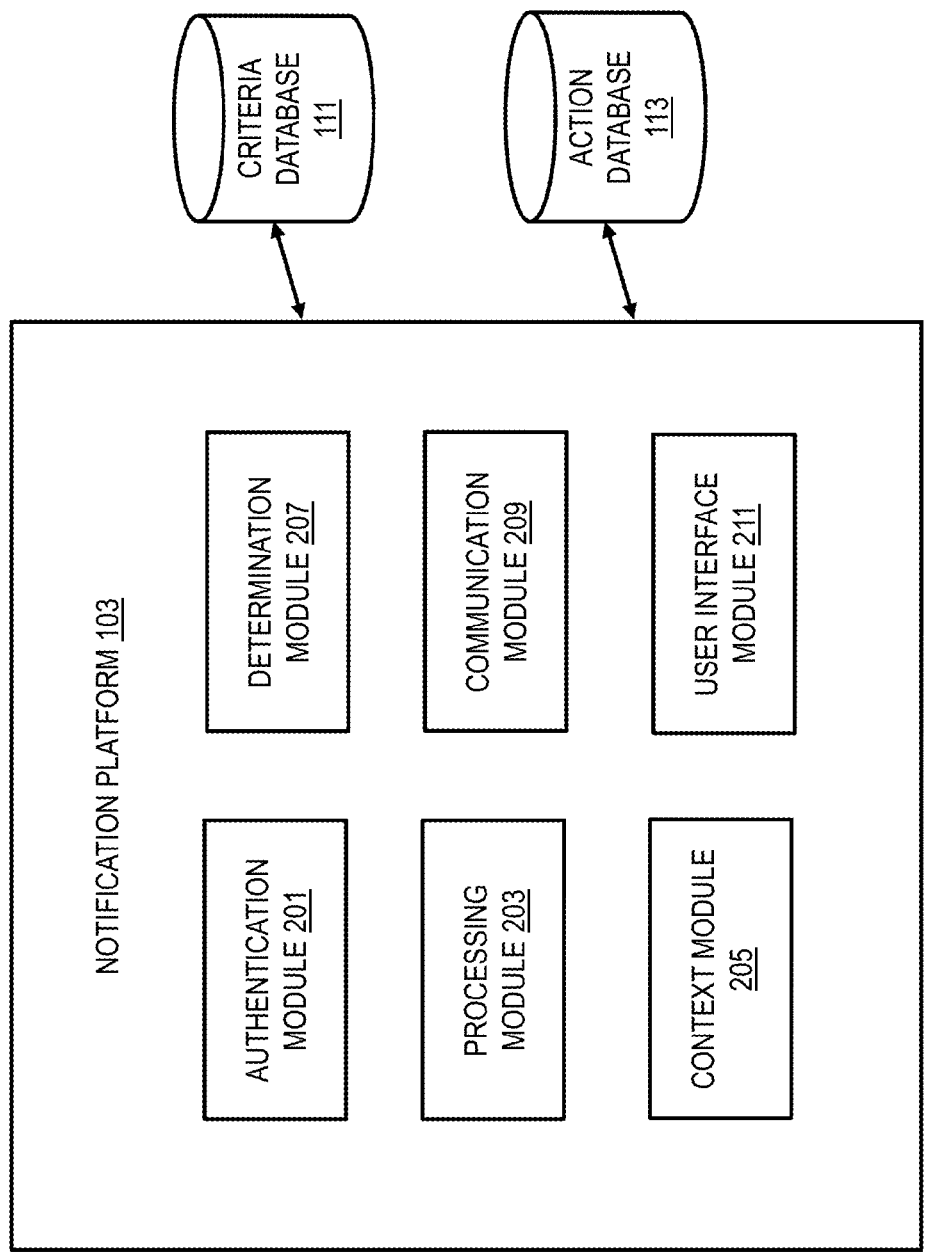
FIG. 2 is a diagram of the components of a notification platform, according to one embodiment.

FIG. 2 is a diagram of the components of a notification platform, according to one embodiment. By way of example, the notification platform 103 includes one or more components for alerting device users engaged in various modes of travel they are creating a bottleneck. It is contemplated that the functions of these components may be combined in one or more components or performed by other components of equivalent functionality. In this embodiment, the notification platform 103 includes an authentication module 201, a processing module 203, a context module 205, a determination module 207, a communication module 209 and a user interface module 211.

The authentication module 201 authenticates users and UE 101 for interaction with the notification platform 103. By way of example, the authentication module 201 receives a request to access the notification platform 103 via an application 107. The request may be submitted to the authentication module 201 via the communication module 209, which enables an interface to the navigation application 107 and the platform 103. Alternatively, the communication module 209 and user interface module 211 may operate in connection with the authentication module 201 to support execution of various APIs of a navigation application of the UE 101. Per these APIs, for example, the user may access the notification platform 103 as a function of the navigation application accordingly.

The processing module 203 may detect and subsequently process movement pattern information associated with a UE 101 and/or neighboring UE. By way of example, the processing module 203 processes the information to determine a grouping range of the respective neighboring UE to UE 101, wherein the range indicates a proximity of the users to one another. A closer proximity of the users may correspond to a first range, while a second and third range may correspond to successively lesser proximity of the neighboring UE to the UE 101 of the user. In addition, the module 203 processing the movement pattern information to determine a speed of movement, a direction of movement, a timing of movement or a combination thereof of the UE 101 and respective neighboring devices.

It is noted that the processing module 203 may be triggered for execution based on the determined entry of another UE to within range of UE 101; thus indicating the need for a bottleneck verification/analysis. Furthermore, the processing module 203 may operate in connection with the authentication module 201 to persistently collect historical movement pattern information, crowd sourced information, or the like. As such, the processing module 203 may receive and process this historical data as feedback for enabling subsequent analysis by the determination module 207.

The context module 205 may process contextual information associated with one or more users, the UE 101, the neighboring UE or a combination thereof. For example, the contextual information may include sensor information, environmental condition information, obstruction information and any other data capable of acquisition by way of the services 109 and sensors of the UE 101 and/or vehicle. The context module 205 may also operate in connection with the processing module 201 to gather content from various content providers 115 for determining information related to objects (e.g., landmarks, roadways, buildings, parks) within a specific range of a user or UE 101. It is noted that the data accessed from or gathered by the services 109 and content providers 115 may be used by the context module 205 to determine relevant environmental, social, locality or user related information. In addition, the processing module 203 and determination module 207 may process the data to determine geometric and spatial relationships between respective users/UE 101 and objects for a given location or range of interest.

The determination module 207 determines, based on the criteria (per criteria database 111), whether a bottleneck condition is fulfilled. In addition, the module 207 determines which user and/or UE 101 is the source of the bottleneck. This determination may be performed by the module 207 on the basis of determined difference in the speed of movement, the direction of movement, the timing of movement, or a combination thereof between the UE 101 of a user and the various neighboring UE 101. Also, the determination module 27 may access an action database 113 for calculating one or more recommended actions or pertinent status information to convey to a user based on a determined bottleneck. The recommended action or pertinent status information as may vary depending on the user in question (the user that is the bottleneck versus the user subject to the bottleneck), the mode of travel (pedestrian versus vehicular travel), the travel path (airport walkway versus freeway) or other factors.

Still further, the determination module 207 may initiate various preventative measures at the UE 101 or application 107 based on historical movement pattern information. Per this information, the platform 103 may cause a delay, suspension or halting of certain executions of the UE 101 or applications 107. By way of this execution, for example, an incoming notification (e.g., SMS, email), application launch or other execution may be delayed until the location and/or venue associated with the bottleneck is surpassed by the user.

The user interface module 211 may cause the presentment of messages to the display of the UE 101, the neighboring UE, or a combination thereof responsive to the determination of a bottleneck. This includes, for example, performing consistent updating of presentation elements and synchronizing the display of information to respective UE 101 relative to their location along the path of travel, whether they are the bottleneck, etc. Of note, the user interface module 211 may operate in connection with the communication module 209 for facilitating the exchange of navigation information via the communication network 105 with respect to the services 109, content providers 115 and applications 107.

The above presented modules and components of the notification platform 103 can be implemented in hardware, firmware, software, or a combination thereof. Though depicted as a separate entity in FIG. 1, it is contemplated that the platform 103 may be implemented for direct operation by respective UE 101. As such, the notification platform 103 may generate direct signal inputs by way of the operating system of the UE 101 for interacting with the application 107. In another embodiment, one or more of the modules 201-211 may be implemented for operation by respective UE as a platform 103, cloud based service, or combination thereof.

Figure 3A:
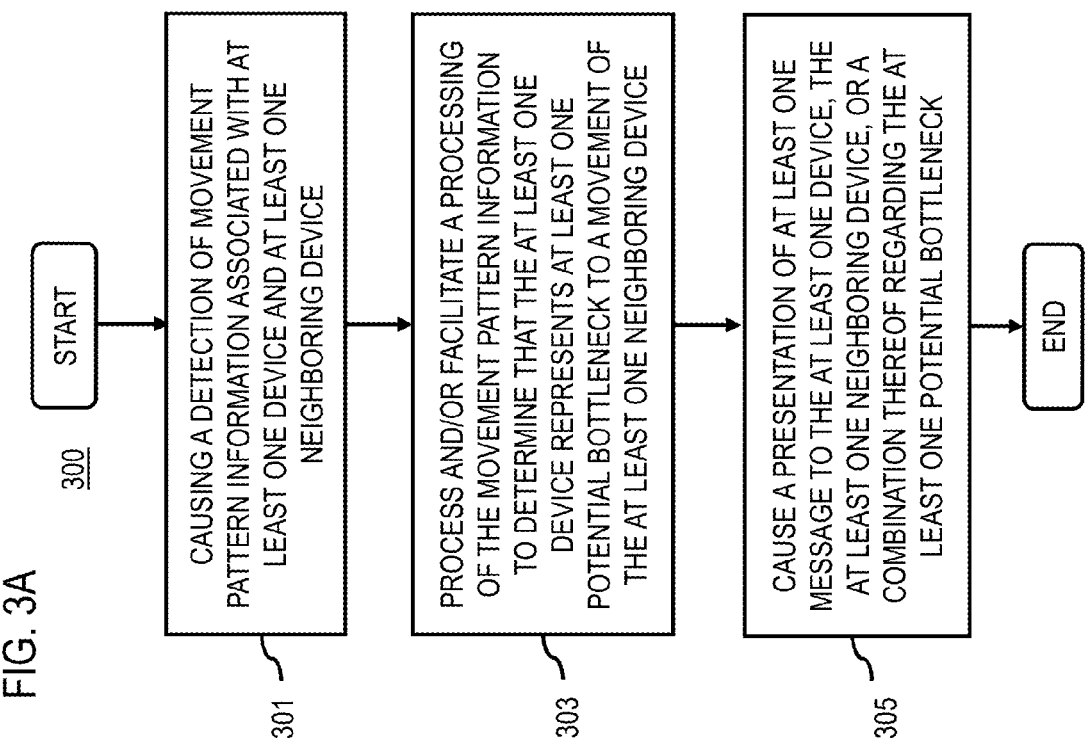
Figure 3B:
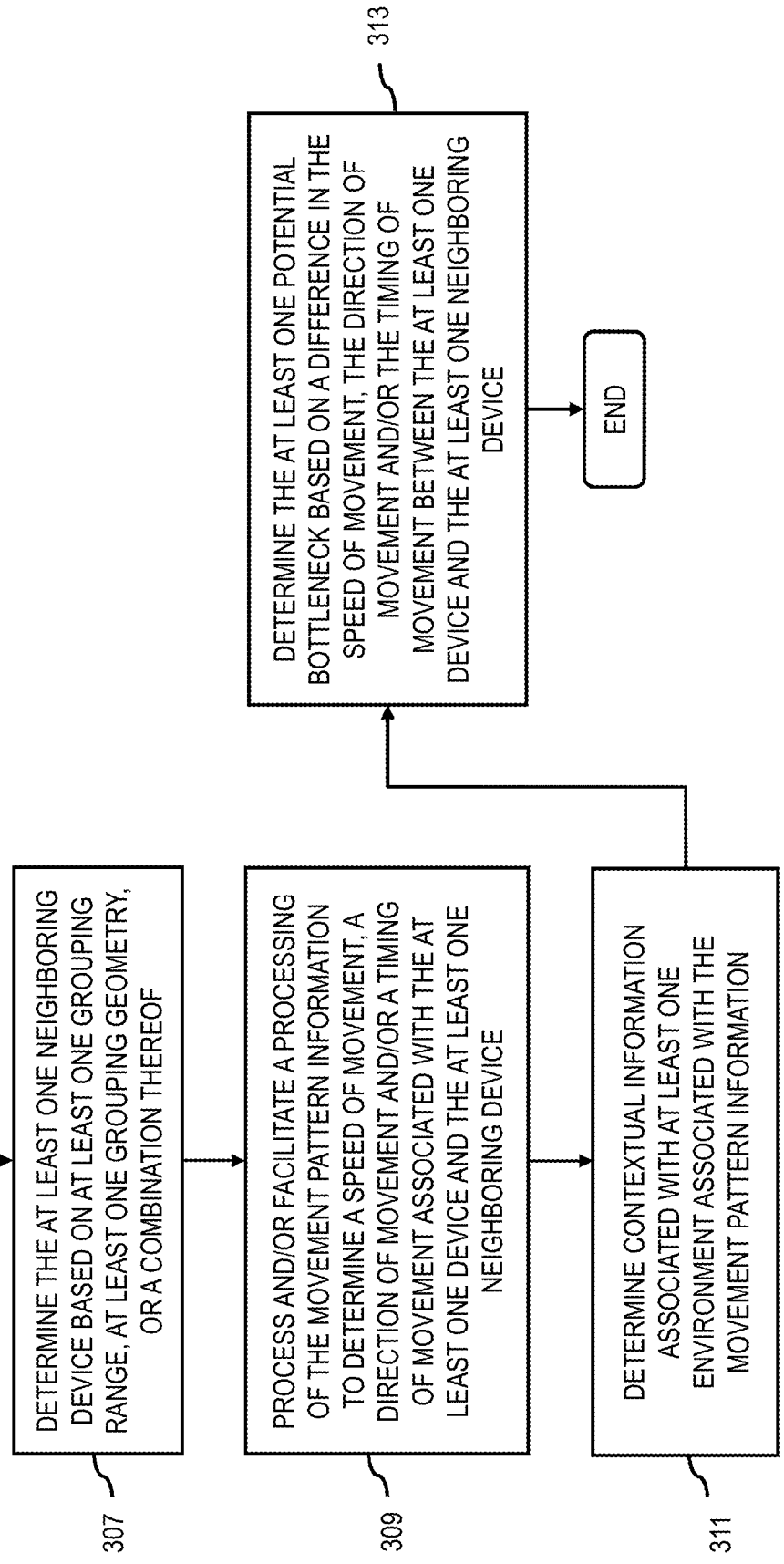
Figure 7:
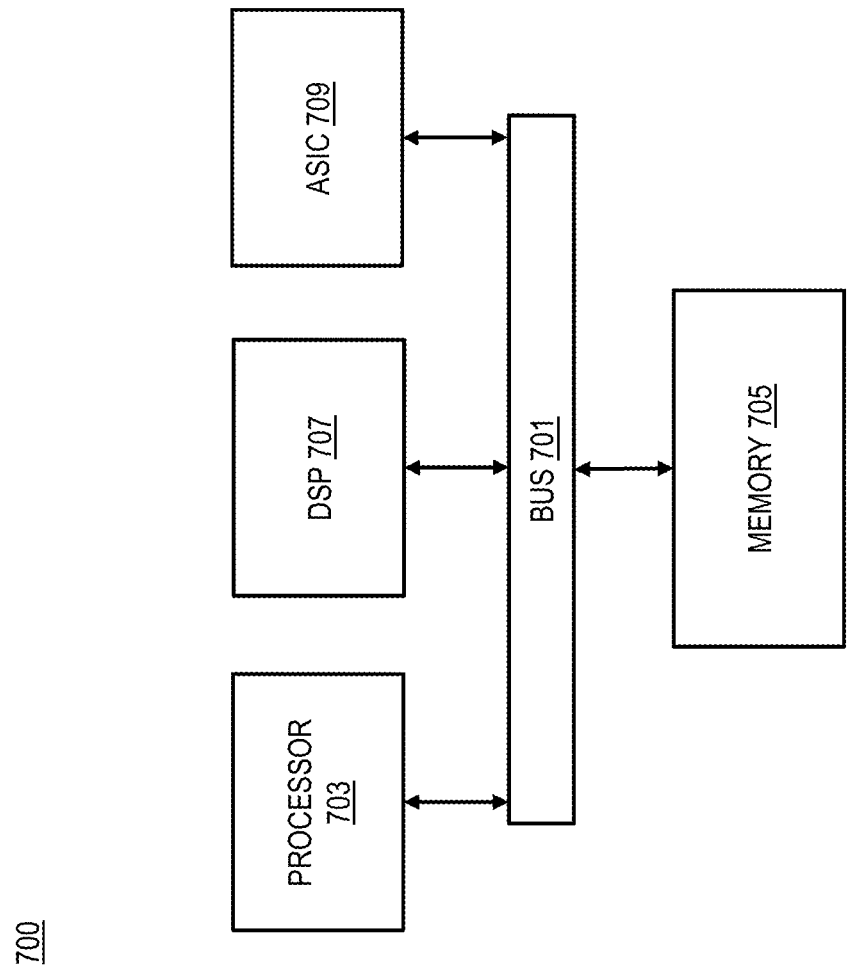
FIG. 7 is a diagram of a chip set that can be used to implement an embodiment of the invention.

FIGS. 3A, 3B and 4 are flowcharts of processes for alerting device users engaged in various modes of travel they are creating a bottleneck, according to various embodiments. In one embodiment, the notification platform 103 performs processes 300, 306 and 400 is implemented in, for instance, a chip set including a processor and a memory as shown in FIG. 7.

In step 301 of process 300 (FIG. 3A), the notification platform 103 causes, at least in part, a detection of movement pattern information associated with at least one device and at least one neighboring device. In another step 303, the platform 103 processes the movement pattern information to determine that the at least one device represents at least one potential bottleneck to a movement of the at least one neighboring device. As noted, the movement pattern information may be associated with a walking movement, vehicle movement, an ad-hoc movement, or a combination thereof. Furthermore, the movement pattern information may include any data capable of being processed for determining a direction of travel, speed of travel, pace/rate of travel, path of travel, type/mode of travel, a location and/or proximity of travelers relative to one another, or a combination thereof.

In another step 305, the notification platform 103 causes a presentation of at least one message to the at least one device, the at least one neighboring device, or a combination thereof regarding the at least one potential bottleneck. As mentioned previously, the message may correspond to a recommendation of an action to be taken by a user in response to the bottleneck, an instruction to be executed by the user or status information associated with the user as they travel along a travel path.

In another step 307 of process 306 (FIG. 3B), the notification platform 103 determines the at least one neighboring device based on at least one grouping range, at least one grouping geometry, or a combination thereof. In another step 309, the platform 103 processes the movement pattern information to determine a speed of movement, a direction of movement, a timing of movement, or a combination thereof associated with the at least one device and the at least one neighboring device. As noted, the geometry information may be based on the culling of data from various services 109 and/or content providers 115.

In step 311, the notification platform 103 determines contextual information associated with at least one environment associated with the movement pattern information. Per step 313, the platform 103 determines the at least one potential bottleneck based on a difference in the speed of movement, the direction of movement and/or the timing of movement between the at least one device and the at least one neighboring device. It is noted that the determining of the bottleneck is based at least in part on location information and/or contextual information gathered in association with the user devices, the users, the neighboring devices, or a combination thereof. Also, the contextual information may indicate a narrowness of a travel path, a presence of an obstruction, a presence of an alternate path for passing, or a combination thereof.

In step 401 of process 400 (FIG. 4A), the notification platform 103 determines one or more criteria for selecting the at least one neighboring device based, at least in part, on the speed limit, the geometry of the at least one environment, or a combination thereof. In step 403, the platform 103 causes, at least in part, a calculation of at least one recommended action, at least one recommended alternate travel path, at least one recommended overtaking point, at least one expected duration of the at least one potential bottleneck, at least one recommended movement speed, or a combination thereof to avoid the at least one potential bottleneck. It is noted that the at least one recommended action, the at least one recommended alternate travel path, the at least one recommended overtaking point, the at least one expected duration of the at least one potential bottleneck, the at least one recommended movement speed, or a combination thereof is presented in the at least one message.

Per step 405, the notification platform 103 causes, at least in part, a triggering of the presentation of the at least one message based, at least in part, on one or more travel management criteria, one or more received complaints, or a combination thereof. As mentioned previously, the travel management criteria may correspond to information and/or conditions for enabling the user to assess the severity of a bottleneck and its effect on the user or neighboring users during a navigation session. The alternate route information may be determined and conveyed based on this criteria as well. Also, the complaints may include feedback information generated by various users along a travel path, crowd sourced feedback information, or the like.

In step 407, the notification platform 103 causes at least in part, an enabling, a disabling, or a combination thereof of at least one function associated with the at least one device, the at least one neighboring device, or a combination thereof based, at least in part, on the at least one potential bottleneck. As noted, the enabling and/or disabling may be associated with a safety mode of execution of the user device with respect to the bottleneck or may include overriding a user interface execution of an application of the device to ensure display of the message.

FIGS. 5A-5I are diagrams of various modes of travel of users and corresponding interfaces of user devices utilized in the processes of FIGS. 3A, 3B and 4, according to various embodiments. The diagrams depict the user interfaces of a navigation application, the notification platform 103, or a combination thereof in response to various movement patterns of device users. It is noted that the devices are configured for interaction with the notification platform 103.

Furthermore, per this example, the users employ different user equipment 101 for interfacing with the notification platform 103 and the associated navigation service. This includes, for example, a smartphone 508 that executes a navigation application corresponding to user interface 509. In addition, other users employ in vehicle navigation systems that feature a user interface 531. Still further, other users operate in-vehicle navigation systems corresponding to user interface 539. The notification platform 103 performs one or more application programming interface executions for enabling the presentment of messages regarding a determined bottleneck.

Figure 5B:
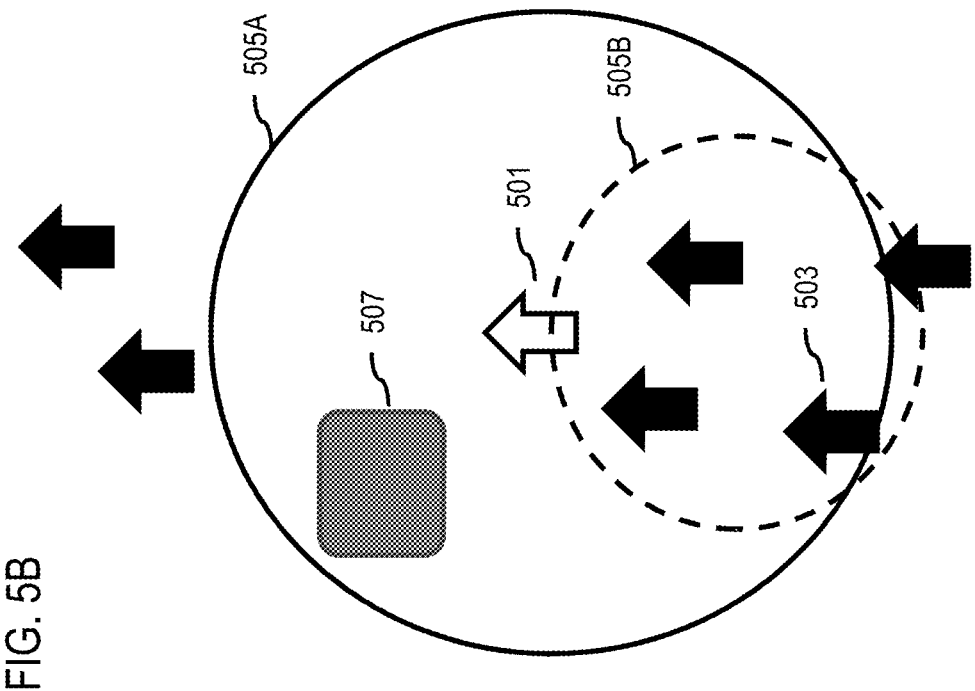
Figure 5A:
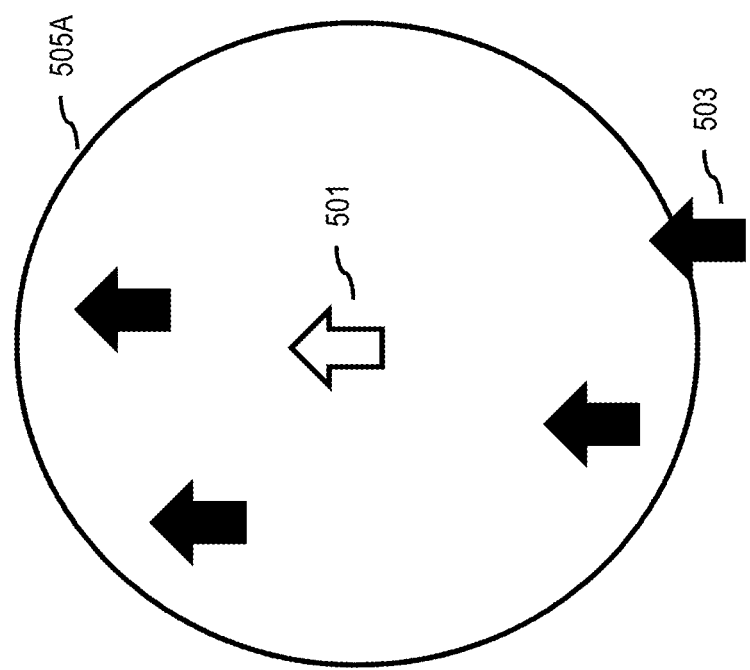

In FIG. 5A, a device user as depicted by arrow 501 is traveling along a path in a direction corresponding to the arrow. In addition, other (neighboring) device users are also depicted as travelling within proximity of the user 501, according to a second grouping range 505A for representing a greater distance from the user 501. The neighboring device users travel in the same direction along the same travel path, i.e., as depicted by arrow 503. Per the notification platform 103, the device of the user 501 is configured to detect movement pattern information associated with the user and the neighboring users (e.g., 503), including walking pace information, motion data, speed information, etc. In addition, the platform 103 may acquire contextual information regarding the users and neighboring users, including location information, travel path geometry information, etc. It is noted that the movement pattern information is generated persistently as the various device users travel or remain in close proximity to the user 501.

In FIG. 5B, when the device user 501 slows their walking pace, such as due to their engagement with a friend via a video chat session (as depicted in FIG. 5C), they inadvertently walk slower than other people around them. Resultantly, the number of devices within a first grouping range 505B—representing the closest proximity to the user 501—increases as the neighboring users 503 are subject to the bottleneck. In addition, per the determined travel path geometry, the platform identifies an obstruction 507 which further limits the ability of the neighboring users to pass user 501. In response to the bottleneck, the notification platform 103 may be prompted automatically to generate a notification message to the device of the user 501 responsible for the bottleneck. Alternatively, one of the neighboring users 503 may initiate transmission of a notification message for alerting the user 501.

In FIG. 5C, the notification platform 103 triggers presentment of the message 513 to the user interface 509 of the user device 508 of the user 501. In this case, the notification message 513 is presented atop the user interface of the video chat session, as depicted per image 511, to ensure the user 501 views the message 513. As such, the message 513 intentionally interrupts the current view and/or activity of the user for enabling the user 501 to take action. The message 513 specifies that the user is creating a bottleneck along with a few recommended actions the user can take to eliminate the bottleneck. As an alternate example, the message 513 may include content for indicating a time frame which the user has before they c In response to the message 513 and the recommendations, the user 501 decides to move to the side and cease moving. As a result, this provides ample room for the neighboring users 503 to pass by the user 501 as well as the obstruction 507. As the user 501 is standing still and to the side of the pathway to allow others to pass, no further notification message 513 is presented. This corresponds to an automatic closing of the notification message 513 by the notification platform 103 based on the persistent detection of the changing movement pattern information of respective users. Alternatively, the user may close the message 513 manually by selecting the close action button 515.

Of note, in the case where the user does not respond to the message 513, the message may be prevented from being closed per the close action button 515 until the user performs at least one of the recommended actions. As another example, the message may be presented repeatedly in the case where the user 501 fails to comply. Thus, the platform 103 ensures the message 513 is presented until the neighboring users are able to pass the user 501, overcome the obstruction 507 to pass the device user 501, or a combination thereof.

In FIG. 5E, various users of vehicles 521, 523 and 525 with in-vehicle navigation systems are driving along a narrow roadway 520. The roadway is a two-lane roadway that eventually merges, per merge signals 527, into a single lane. Under this scenario, the lead vehicle 521 is driving significantly below the allowed speed limit of the roadway 520 and is a bottleneck to the drivers of vehicles 523 and 525. The user of vehicle 523 attempts to bypass vehicle 521, but cannot due to the impending merging of the lanes.

The notification platform 103 processes movement pattern information regarding the vehicles 521-525 and contextual information regarding the roadway 520 to determine that the user of vehicle 521 is the bottleneck. By way of example, the in-vehicle navigation system user interface 531 presents a message 533 to the user of vehicle 525 for indicating that the user of vehicle 521 is the source of the bottleneck. The message 533 also presents an option for the user of vehicle 525 to send a message to the driver of vehicle 521 for requesting they take action to eliminate or minimize the bottleneck. When the user selects the YES action button 535, a message 533 is sent to the in-vehicle navigation system 530 of the user of vehicle 521 for presenting an alert message 541 to the user interface 539. It is noted that car-to-car notification, intelligent vehicle communication or various wireless communication techniques may be employed for transmitting the message. Still further, the platform 103 may initiate an instruction for disabling systems of the vehicle that may contribute to the preoccupation of the user of vehicle 521 until the bottleneck is overcome. This may include disabling of an in-vehicle entertainment system, media player, gaming system, infotainment system, or any other UE accordingly.

In this example, the alert message 541 indicates that user of vehicle 521 has been identified as a bottleneck. In addition, the message 541 also presents various recommended actions the user may employ for responding to the bottleneck. A first action includes taking an alternate route by exiting a different road (Hatfields Road) 529 than originally planned. The user may select this option by pressing action button 543, which triggers rerouting of the navigation application per the newly selected route information. A second action button 545 corresponds to a ignoring of the notification message 541. A third recommended action 547 is also presented for indicating the user should speed up their pace so they at least match the speed limit of the roadway 520.

As the vehicles proceed along the roadway 520, the user of vehicle 523 merges into the open lane just behind the vehicle 521 due to the impending merge 527. This corresponds to FIG. 5H. In this case, the user of vehicle 521 ignores the navigation message 541 or altogether fails to take any of the recommended corrective actions as presented per user interface 539. Resultantly, the interface 531 of the in-vehicle navigation system of vehicle 525 is caused by the platform 103 to present status information 549 regarding the current bottleneck per FIG. SI. The status information 549 includes data for enabling the user to manage the bottleneck, assess their options, etc. In this case, the status information 549 includes details regarding the number of miles left before the user of vehicle 525 can overtake/pass up vehicle 521 (corresponding to the end of the merged lane 527). Also presented are details for indicating the time delay created by the bottleneck as well as possible exit routes for the driver of vehicle 521.

In addition, the notification platform 103 presents a recommendation for enabling the user to reroute the current navigation session based on the best available rerouting options. The best available routing options may be determined in conjunction with the navigation application based on current contextual information and motion pattern information pertaining to the current formation and/or movement of the vehicles 521-525 at this time along the roadway 520. Under this scenario, when the user selects the YES action button 551, the platform 103 operates in connection with the navigation application to determine an option for the user to reroute via the Hatfields Road exit 529. While not shown, a message may be generated for indicating to the user that selection of this routing option will result in the user reducing their delay time by 10 minutes as opposed to subjecting themselves to the anticipated 25 minute delay caused by the bottleneck.

It is contemplated, in certain embodiments, that the notification platform 103 may also present messages for warning the driver they are an on the verge of creating a bottleneck. For example, a message may be generated for indicating that incoming rain could cause a bottleneck at an upcoming viaduct that user is approaching. In this case, the platform 103 may process weather, temporal and location information for determining the impending bottleneck. As another example, in the case where the user is parked improperly, the platform may generate a message that reads: "If the user remains parked improperly here for 3 more minutes, it will create a bottleneck." Again, this may be based on location information, municipality information, temporal information, traffic data or other contextual information.

As another example, the notification platform 103 may also present messages for indicating that a driver attempting to park is inadvertently becoming a bottleneck. In this case, the platform 103 may analyze the movement pattern information to determine intermittent stopping, reversal or other movement of the vehicle in addition to location and temporal information for determining parking activity. In response, the platform 103 may recommend a travel route that may unblock other drivers while still enabling the driver to find a parking space. Hence, the notification platform 103 enables users to detect, pre-empt and respond to bottlenecks.

The processes described herein for alerting device users engaged in various modes of travel they are creating a bottleneck may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
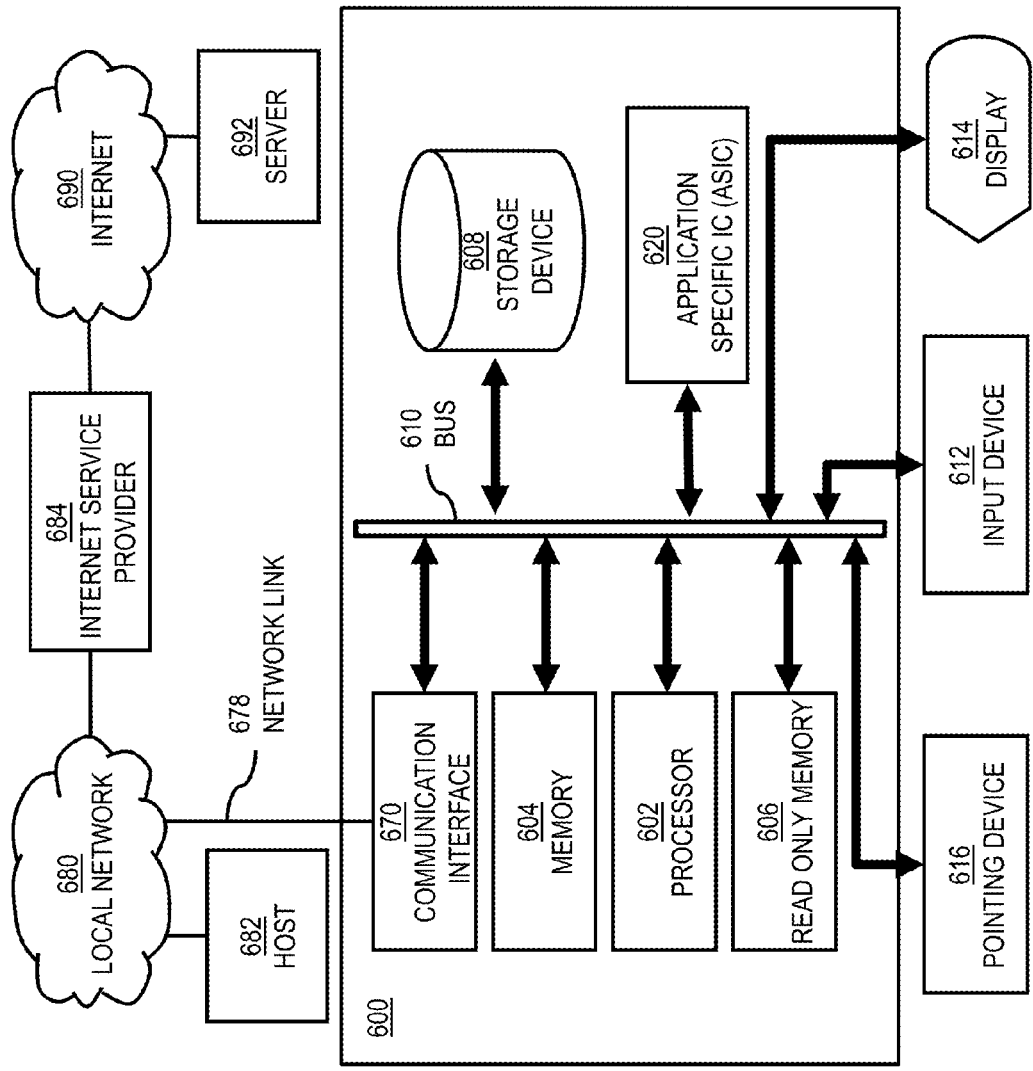
FIG. 6 is a diagram of hardware that can be used to implement an embodiment of the invention.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5C, 5F, 5G and 5I, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 either use electrical, electromagnetic or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to adapt navigation notifications based on a level of compliance of users to the notifications as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of adapting navigation notifications based on a level of compliance of users to the notifications.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to adapt navigation notifications based on a level of compliance of users to the notifications. The memory 705 also stores the data associated with or generated by the execution of the inventive steps.

Figure 8:
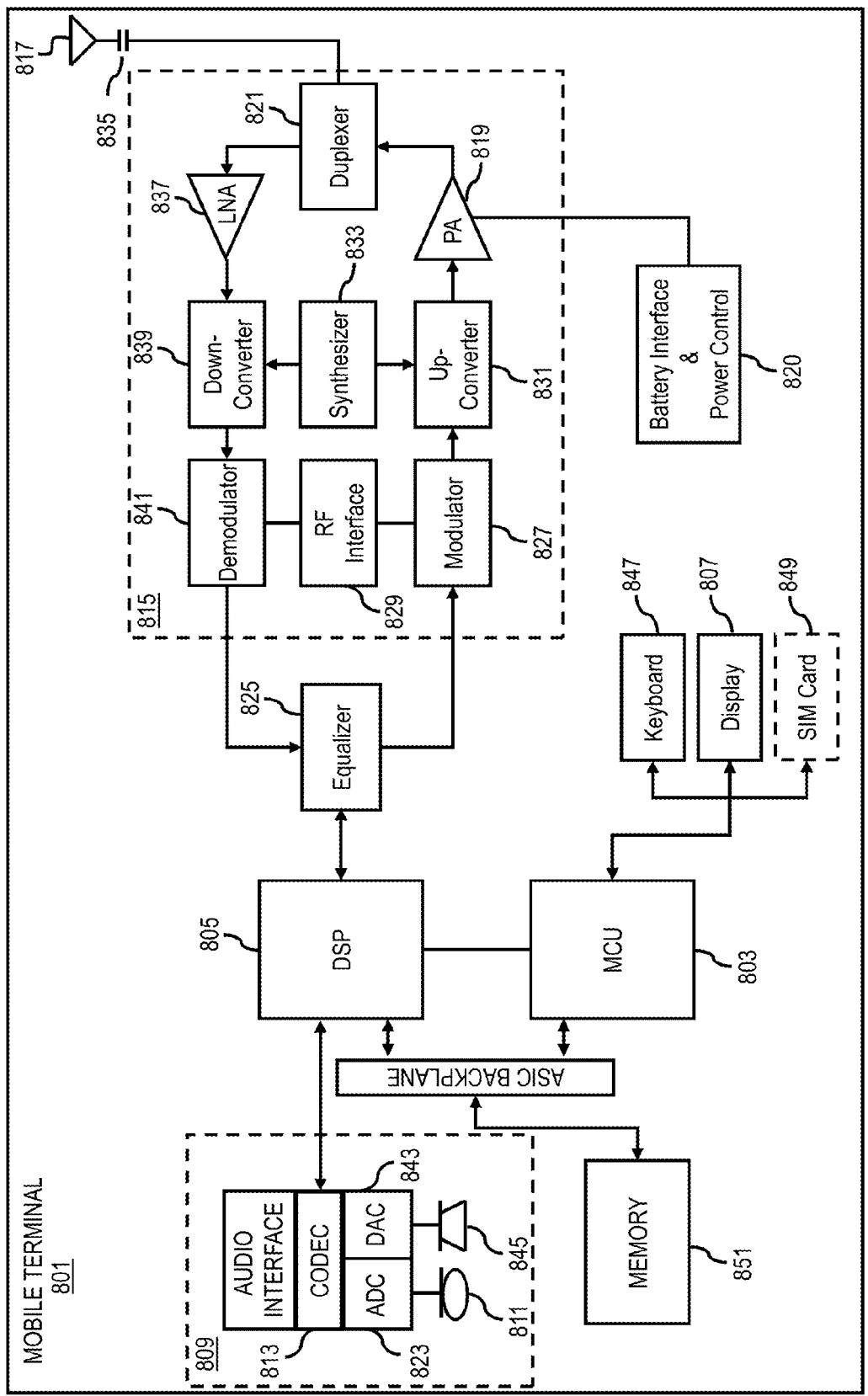
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of adapting navigation notifications based on a level of compliance of users to the notifications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of adapting navigation notifications based on a level of compliance of users to the notifications. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to adapt navigation notifications based on a level of compliance of users to the notifications. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   causing, at least in part, a detection of movement pattern information associated with at least one device and at least one neighboring device based, at least in part, on the at least one neighboring device dynamically switching between a longer range wireless connectivity and a shorter range wireless connectivity, wherein when the at least one device is initially detected by the at least one neighboring device via the longer range wireless connectivity but later is capable of being detected via the longer range wireless connectivity and the shorter range wireless connectivity, determining that the at least one device and the at least one neighboring device are moving towards each other;
   processing and/or facilitating a processing of the movement pattern information to determine that the at least one device represents at least one potential bottleneck to a movement of the at least one neighboring device; and
   causing, at least in part, a presentation of at least one message to the at least one device, the at least one neighboring device, or a combination thereof regarding the at least one potential bottleneck.

2. The method of claim 1, further comprising:
   determining the at least one neighboring device based on at least one grouping range, at least one grouping geometry, or a combination thereof.

3. The method of claim 1, further comprising:
   processing and/or facilitating a processing of the movement pattern information to determine a speed of movement, a direction of movement, a timing of movement, or a combination thereof associated with the at least one device and the at least one neighboring device; and
   determining the at least one potential bottleneck based, at least in part, on a difference in the speed of movement, the direction of movement, the timing of movement, or a combination thereof between the at least one device and the at least one neighboring device.

4. The method of claim 1, wherein the movement pattern information is associated with a walking movement, vehicle movement, an ad-hoc movement, or a combination thereof.

5. The method of claim 1, further comprising:
   determining contextual information associated with at least one environment associated with the movement pattern information,
   wherein the determination that the at least one device represents at least one potential bottleneck is based, at least in part, on the contextual information.

6. The method of claim 5, wherein the contextual information includes, at least in part, a narrowness of a travel path, a presence of an obstruction, a presence of an alternate path for passing, or a combination thereof.

7. The method claim 5, wherein the contextual information includes, at least in part, a speed limit, a geometry of the at least one environment, a geometry of a vehicle, or a combination thereof, the method further comprising:
   determining one or more criteria for selecting the at least one neighboring device based, at least in part, on the speed limit, the geometry of the at least one environment, or a combination thereof.

8. The method of claim 1, further comprising:
   causing, at least in part, a calculation of at least one recommended action, at least one recommended alternate travel path, at least one recommended overtaking point, at least one expected duration of the at least one potential bottleneck, at least one recommended movement speed, or a combination thereof to avoid the at least one potential bottleneck,
   wherein the at least one recommended action, the at least one recommended alternate travel path, the at least one recommended overtaking point, the at least one expected duration of the at least one potential bottleneck, the at least one recommended movement speed, or a combination thereof is presented in the at least one message.

9. The method of claim 1, further comprising:
   causing, at least in part, a triggering of the presentation of the at least one message based, at least in part, on one or more travel management criteria, one or more received complaints, or a combination thereof.

10. The method of claim 1, further comprising:
causing, at least in part, an enabling, a disabling, or a combination thereof of at least one function associated with the at least one device, the at least one neighboring device, or a combination thereof based, at least in part, on the at least one potential bottleneck.

11. An apparatus comprising:
at least one processor; and
at least one memory including computer program code for one or more programs,
the at least one memory and the computer program code configured to, with the at least one processor, cause the apparatus to perform at least the following,
cause, at least in part, a detection of movement pattern information associated with at least one device and at least one neighboring device based, at least in part, on the at least one neighboring device dynamically switching between a longer range wireless connectivity and a shorter range wireless connectivity, wherein when the at least one device is initially detected by the at least one neighboring device via the longer range wireless connectivity but later is capable of being detected via the longer range wireless connectivity and the shorter range wireless connectivity, determining that the at least one device and the at least one neighboring device are moving towards each other;
process and/or facilitate a processing of the movement pattern information to determine that the at least one device represents at least one potential bottleneck to a movement of the at least one neighboring device; and
cause, at least in part, a presentation of at least one message to the at least one device, the at least one neighboring device, or a combination thereof regarding the at least one potential bottleneck.

12. The apparatus of claim 11, wherein the apparatus is further caused to:
determine the at least one neighboring device based on at least one grouping range, at least one grouping geometry, or a combination thereof.

13. The apparatus of claim 11, wherein the apparatus is further caused to:
process and/or facilitate a processing of the movement pattern information to determine a speed of movement, a direction of movement, a timing of movement, or a combination thereof associated with the at least one device and the at least one neighboring device; and
determine the at least one potential bottleneck based, at least in part, on a difference in the speed of movement, the direction of movement, the timing of movement, or a combination thereof between the at least one device and the at least one neighboring device.

14. The apparatus of claim 11, wherein the movement pattern information is associated with a walking movement, vehicle movement, an ad-hoc movement, or a combination thereof.

15. The apparatus of claim 11, wherein the apparatus is further caused to:
determine contextual information associated with at least one environment associated with the movement pattern information,
wherein the determination that the at least one device represents at least one potential bottleneck is based, at least in part, on the contextual information.

16. The apparatus of claim 15, wherein the contextual information includes, at least in part, a narrowness of a travel path, a presence of an obstruction, a presence of an alternate path for passing, or a combination thereof.

17. The An apparatus of claim 15, wherein the contextual information includes, at least in part, a speed limit, a geometry of the at least one environment, a geometry of a vehicle, or a combination thereof, the apparatus further comprising:
determine one or more criteria for selecting the at least one neighboring device based, at least in part, on the speed limit, the geometry of the at least one environment, or a combination thereof.

18. A non-transitory computer-readable storage device carrying one or more sequences of one or more instructions which, when executed by one or more processors, cause an apparatus to at least perform the following steps:
cause, at least in part, a detection of movement pattern information associated with at least one device and at least one neighboring device based, at least in part, on the at least one neighboring device dynamically switching between a longer range wireless connectivity and a shorter range wireless connectivity, wherein when the at least one device is initially detected by the at least one neighboring device via the longer range wireless connectivity but later is capable of being detected via the longer range wireless connectivity and the shorter range wireless connectivity, determining that the at least one device and the at least one neighboring device are moving towards each other;
process and/or facilitate a processing of the movement pattern information to determine that the at least one device represents at least one potential bottleneck to a movement of the at least one neighboring device; and
cause, at least in part, a presentation of at least one message to the at least one device, the at least one neighboring device, or a combination thereof regarding the at least one potential bottleneck.

19. The non-transitory computer-readable storage device of claim 18, wherein the apparatus is further caused to:
determine the at least one neighboring device based on at least one grouping range, at least one grouping geometry, or a combination thereof.

20. The non-transitory computer-readable storage device of claim 19, wherein the apparatus is further caused to:
process and/or facilitate a processing of the movement pattern information to determine a speed of movement, a direction of movement, a timing of movement, or a combination thereof associated with the at least one device and the at least one neighboring device; and
determine the at least one potential bottleneck based, at least in part, on a difference in the speed of movement, the direction of movement, the timing of movement, or a combination thereof between the at least one device and the at least one neighboring device.

* * * * *